United States Patent
Fookes et al.

(10) Patent No.: US 6,751,559 B2
(45) Date of Patent: Jun. 15, 2004

(54) METHOD FOR SUPPRESSING NOISE FROM SEISMIC SIGNALS BY SOURCE POSITION DETERMINATION

(75) Inventors: Gregory Peter Gwyn Fookes, Brookwood (GB); Roald Gunnar van Borselen, Wassenaar (NL); Jaafar Ali, Woking (GB); John Brittan, Walton-on-Thames (GB); Jeroen Hubertus Maria Hoogeveen, Woking (GB)

(73) Assignee: PGS Exploration (UK) Limited, Walton-on-Thames (GB)

( * ) Notice: Subject to any disclaimer, the term of this patent is extended or adjusted under 35 U.S.C. 154(b) by 0 days.

(21) Appl. No.: 10/238,837

(22) Filed: Sep. 10, 2002

(65) Prior Publication Data

US 2004/0049347 A1 Mar. 11, 2004

(51) Int. Cl.$^7$ .................................................. G01V 1/28
(52) U.S. Cl. .............................. 702/17; 367/20; 367/21
(58) Field of Search ............................ 702/14, 17, 18; 367/20–24

(56) References Cited

U.S. PATENT DOCUMENTS

| | | |
|---|---|---|
| 5,424,999 A | 6/1995 | Manin |
| 5,448,531 A * | 9/1995 | Dragoset, Jr. ................. 367/24 |
| 5,729,506 A * | 3/1998 | Dragoset, Jr. et al. ........ 367/24 |
| 5,761,152 A | 6/1998 | Jacobsen et al. |
| 5,818,795 A | 10/1998 | Hawkins et al. |
| 5,995,905 A * | 11/1999 | Ikelle et al. .................. 702/14 |
| 6,088,299 A * | 7/2000 | Erath et al. .................. 367/154 |
| 6,148,264 A * | 11/2000 | Houck et al. ................. 702/14 |
| 6,205,403 B1 * | 3/2001 | Gaiser et al. ................ 702/14 |

OTHER PUBLICATIONS

Buffenmyer, V., Poulton, M., Johnson, R., "Neural network approach to seismic crew noise identification in marine surveys", SEG International Exposition and Sixty–Ninth Annual Meeting, Expanded Abstracts, 1999, 1224–1227, vol. II.

Duren, R.E., Morris, S. V., "Sideswipe removal via null steering", Geophysics, 1992, 1623–1632, vol. 57, No. 12.

Dragoset, B., "Geophysical applications of adaptive–noise cancellation", SEG International Exposition & 65$^{th}$ Annual Meeting, Expanded Abstracts, 1995, 1389–1392.

Gülünay, N., Pattberg, D., "Seismic interference noise removal", SEG International Exposition and Seventy First Annual Meeting, Expanded Abstracts, 2001, 1989–1992, vol. I.

Huaien, W., Guangxin, L., Hinz, C.E., Snyder, F.C., "Attentuation of Marine Coherent Noise", SEG 59th Annual International Meeting, Expanded Abstracts, 1989, 1112–1114, vol. 1.

Lynn, W., Doyle, M., Larner, K., Marschall, R., "Experimental investigation of interference from other seismic crews", Geophysics, 1987, 1501–1524, vol. 52, No. 11.

* cited by examiner

Primary Examiner—Donald McElheny, Jr.
(74) Attorney, Agent, or Firm—E. Eugene Thigpen; Richard A. Fagin

(57) ABSTRACT

A method is disclosed for attenuating noise from marine seismic signals caused by a noise in the water. The method includes determining an arrival time of a noise event at each of a plurality of seismic sensors, estimating a position of the noise source from the arrival times, and attenuating the noise event from the signals detected by the seismic sensors.

40 Claims, 4 Drawing Sheets

METHOD FOR SUPPRESSING NOISE FROM SEISMIC SIGNALS BY SOURCE POSITION DETERMINATION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF INVENTION

1. Field of the Invention

The invention relates generally to the field of seismic data acquisition and processing. More specifically, the invention relates to methods for processing seismic data to attenuate the effects of certain types of noise in recorded seismic signals.

2. Background Art

Seismic surveying is known in the art for determining structures of rock formations below the earth's surface. Seismic surveying generally includes deploying an array of seismic sensors at the surface of the earth in a selected pattern, and selectively actuating a seismic energy source positioned near the seismic sensors. The energy source may be an explosive, a vibrator, or in the case of seismic surveying performed in the ocean, one or more air guns or water guns.

Seismic energy which emanates from the source travels through the earth formations until it reaches an acoustic impedance boundary in the formations acoustic impedance boundaries typically occur where the composition and/or mechanical properties of the earth formation change. Such boundaries are typically referred to as "bed boundaries." At a bed boundary, some of the seismic energy is reflected back toward the earth's surface. The reflected energy may be detected by one or more of the seismic sensors deployed on the surface. Seismic signal processing known in the art has as one of a number of objectives the determination of the depths and geographic locations of bed boundaries below the earth's surface. The depth and location of the bed boundaries is inferred from the travel time of the seismic energy to the bed boundaries and back to the sensors at the surface.

Seismic surveying is performed in the ocean and other bodies of water ("marine seismic surveying") to determine the structure of earth formations below the sea bed. Marine seismic surveying systems known in the art include a vessel which tows one or more seismic energy sources, and the same or a different vessel which tows one or more "streamers." Streamers are arrays of seismic sensors in a cable that is towed by the vessel. Typically, a seismic vessel will tow a plurality of such streamers arranged to be separated by a selected lateral distance from each other, in a pattern selected to enable relatively complete determination of geologic structures in three dimensions. It is also known in the art to place cables having seismic sensors ("ocean bottom cables") along the sea bed, and actuate a seismic energy source in the water. Typically, the seismic energy source will be towed by a vessel just as in streamer-type surveying.

At the bed boundaries, as previously explained, some of the energy from the source is reflected and ultimately detected by the seismic sensors. In addition to reflected seismic energy both coherent noise and incoherent noise may be present in the detected seismic energy. The presence of noise in the energy detected by the seismic sensors reduces the signal to noise ratio ("SNR") of the seismic signals of interest. One objective of seismologists is, therefore, to seek methods of reducing the effects of noise on the signals detected by the sensors without appreciably reducing the true seismic signal component of the detected signals.

Prior art methods which have been used to reduce the effects of noise and acquire a higher quality representation of a particular subsurface structure include using multiple actuations of the seismic source (multiple "firings" or "shots") to record a plurality of sensor measurements from substantially the same subsurface structure, and then summing or "stacking" such measurements to enhance signal strength while substantially reducing the effects of random or incoherent noise.

U.S. Pat. No. 5,818,795 which is assigned to the assignee of the present invention, and which provides a detailed summary of prior art methods and systems addressing the problem of noise suppression in seismic signals, discloses a method of reducing the effect of "burst" noise in seismic signal recordings without eliminating seismic signals of interest.

U.S. Pat. No. 5,761,152, which is assigned to the assignee of the present invention, describes a method and system for marine seismic surveying. The method disclosed in the '152 patent includes increasing the fold (number of recorded reflections from a same reflector), and as a result the signal-to-noise ratio of coherent seismic signals, without incurring the problems of drag, entanglement, complicated deck handling associated with increased streamer length, increased number of streamers, and increased distance between streamers. Source and streamer "offsets", and time of firing of lead and trailing vessel sources in a time delay sequence are optimized to increase the fold while avoiding substantial influence by the seismic signals resulting from the source of one vessel on the seismic signals resulting from the source of the other vessel.

The foregoing description is not meant to be an exhaustive explanation of the types of noise and the methods for reducing the effects thereof in seismic signals. There are two types of noise, however, for which prior art methods have not reduced the effects to an acceptable degree. One of these types of noise is generated by vessels or rigs in the vicinity of the seismic vessel (here termed "continuous ship noise"). The other type of noise is reflected impulsive noise which originates as a result of actuation of the seismic energy source and subsequent reflection of the seismic energy traveling laterally through the water to a reflector in the water, and then back to the sensors on the array (here termed "back scattered noise"). It is desirable to have a method for attenuating back scattered noise and continuous ship noise in marine seismic data.

SUMMARY OF INVENTION

One aspect of the invention is a method for suppressing noise in marine seismic signals caused by a noise source in the water. The method includes determining an arrival time of a noise event at each of a plurality of seismic sensors. A position of the noise source is determined from the arrival times, and the noise event is then attenuated from the signals detected by the seismic sensors.

In one embodiment, attenuating the noise event is performed by statically correcting traces corresponding to the sensor signals, applying a frequency wavenumber filter to the corrected traces, and removing the static correction from the frequency wavenumber filtered traces.

In one embodiment, determining the noise source position includes selecting an initial position of the noise source, applying a moveout to the sensor signal based on the initial position, stacking the moveout corrected signals, and then moving the source position, repeating applying moveout based on the new source position and repeating the stacking, until a power in the stacked signal reaches a maximum.

Other aspects and advantages of the invention will be apparent from the following description and the appended claims.

DETAILED DESCRIPTION

Figure 1:
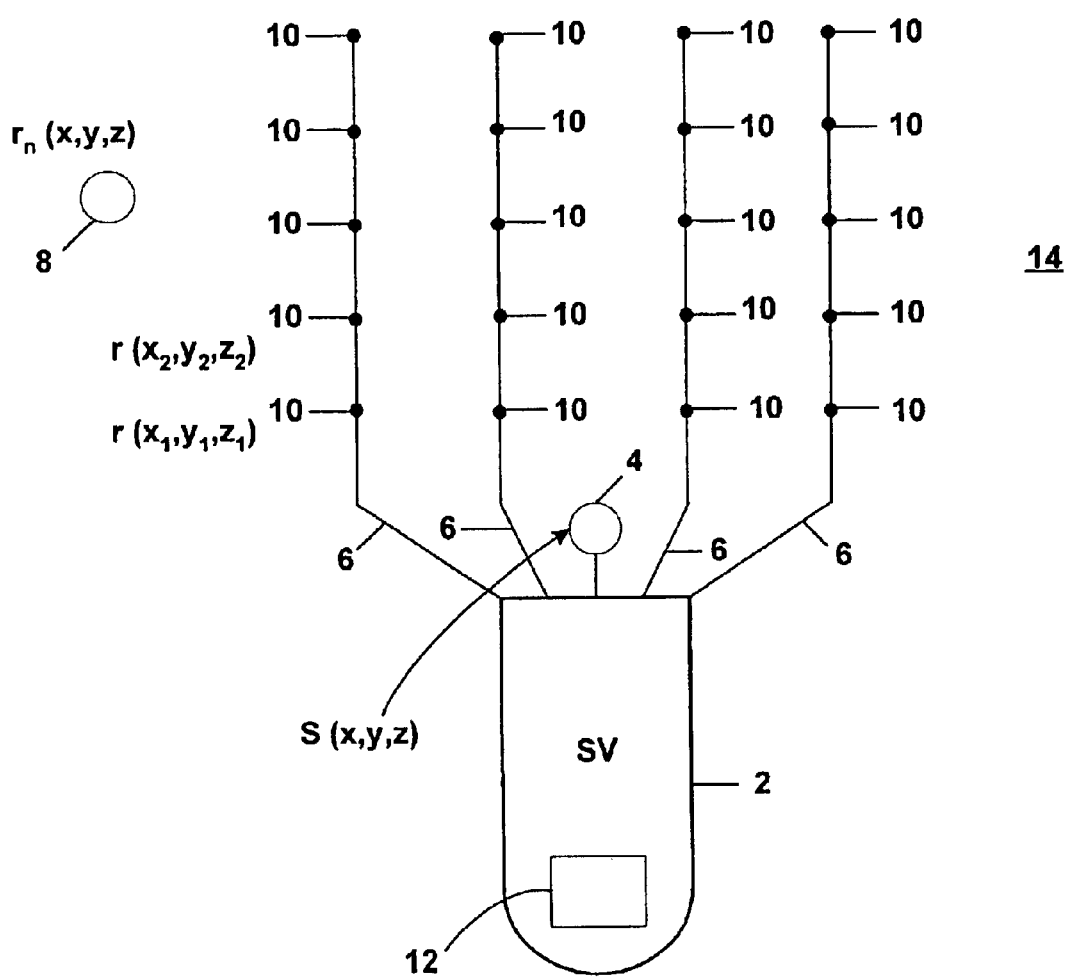
FIG. 1 shows one example of acquiring seismic data which can be used in a method according to the invention.

FIG. 1 shows an example system for acquiring marine seismic data which may be used with the invention. A seismic vessel 2 tows a seismic energy source 4 through the water 14. The seismic vessel 2 also tows a plurality of laterally spaced apart "streamers" or seismic sensor systems as shown at 6. The seismic source 4 in this embodiment can be an air gun array of any type well known in the art. The type of seismic source used in any particular embodiment, however, is not intended to limit the scope of the invention. Each streamer 6 includes a plurality of seismic sensors 10 (typically hydrophones) disposed along each streamer 6 at spaced apart locations. The type of seismic sensor used in any particular embodiment is not intended to limit the scope of the invention.

Each of the sensors 10 detects seismic energy resulting from actuating or "firing" the source 4. As is well known in the art, some of the energy detected by the sensors 10 correspond to reflected seismic energy from structures below the sea floor. Other detected energy may correspond to noise from a source 8 in the water 14. The detected seismic energy is in turn converted by the sensors 10 into electrical signals which are recorded by a recording unit 12 disposed on the seismic vessel 2. The whole cycle of firing and recording signals for each actuation of the source 4 is commonly referred to as generating a "shot" record of that firing. The recording unit 12 on the seismic vessel 2 typically includes navigation systems (not shown separately) used to determine the position of the seismic vessel 2 at any time, and correspondingly, the position of the source 4 and the position of each sensor 10 at any time. Such navigation systems are well known in the art.

The seismic acquisition system shown in FIG. 1 includes a single seismic source 4, and four streamers 6. Other seismic acquisition systems which may be used with methods according to the invention may include two or more seismic sources, in some cases the additional sources being towed by a separate ship or "source vessel." In other acquisition systems, sensors (ocean bottom cables—not shown in FIG. 1) may also be located on the seafloor. Furthermore, the number of streamers and sensors is not a limitation on the scope of the invention. Accordingly, the arrangement of vessel 2, source 4, streamers 6 and sensors 10 shown in FIG. 1 is only meant to illustrate the principle of the invention and is not intended to limit the scope of the invention.

Having shown generally the acquisition of marine seismic data which may be used with the invention, one embodiment of a method according to the invention used to attenuate back scattered noise will now be explained. As explained previously in the Background of the Invention herein, back scattered noise results from seismic energy from a the seismic energy source reflecting from a noise source disposed in the water.

During acquisition of seismic data, the geographic position of the seismic source 4 and each sensor 10 is determined and recorded with respect to time. Therefore, the positions of each sensor 10 and the seismic source 4 can be determined at each time at which seismic signals are recorded, that is, in each "shot record." A shot record, as is known in the art, is a record with respect to time of the signals detected by each one of the sensors 10 in the recording system, the record typically indexed with respect to a time of each actuation or "firing" of the seismic energy source 4.

Determining the positions of the seismic source 4 and the sensors 10 is typically performed by the navigational equipment (not shown separately in FIG. 1). In this embodiment, a travel time of a noise event to selected ones of the sensors 10 is used to determine a position of the noise source 8. When the noise source position is determined, it is then possible to determine an expected noise event arrival time at all the sensors 10. Knowing the expected noise arrival time at all the sensors 10 enables attenuating the noise, as will be further explained.

Methods for determining the position of the noise source 8 can be explained as follows. In the acquisition system of FIG. 1 (or in any other arrangement of seismic acquisition system) there is a total number, represented by n+1, of seismic sensors each of which is located at a position represented by $r_i$ as shown in the following expression:

$$r_i = (x_i, y_i, z_i)^T$$

Two examples of sensor position representation are shown in FIG. 1 as $r(x_1, y_1, z_1)$ and $r(x_2, y_2, z_2)$ An arbitrary position $r_0$ can be selected as a reference position or "origin."

$$r_0 = (x_0, y_0, z_0)$$

In this embodiment, the noise source 8 is located at an initially unknown position represented by $r_n$. The significance of the noise source 8 and its position in this embodiment is that some of the seismic energy which originates from the seismic energy source 4 travels laterally through the water and reflects from the noise source 8. Some of the seismic energy which reflects from the noise source 8 also travels laterally through the water where it is ultimately detected by the sensors 10. Because all of the noise reflecting off the noise source 8 travels through the water, and the acoustic velocity of the water is known or can be readily determined, the distances between the seismic source 4 and the noise source 8, and between the noise source and the sensors 10 can be determined from the travel time of events in the shot record which are reflected from the noise source 8. The following briefly explains how the position of the noise source can be determined from arrival times of noise events in the shot record.

The position of the noise source 8 can be represented by the following expression:

$$r_n = (x_n, y_n, z_n)$$

The distance from the origin to the i-th one of the seismic sensors 10 is represented by the following expression.

$$R_i = \|r_i\| = \sqrt{x_1^2 + y_1^2 + z_1^2}$$

and the distance from the origin to the noise source 8 can be represented by the following expression for $r_n$ $$R_n = \|r_n\| = \sqrt{x_n^2 + y_{n2} + z_{n2}}$$

Therefore the distance between the noise source 8 and the i-th one of the seismic sensors can be calculated by the following expression.

$$D_i = \|r_i - r_n\| = \sqrt{(x_i - x_n)^2 + (y_i - y_n)^2 + (z_i - z_n)^2}$$

A distance between the noise source 8 and the seismic source 4, represented by $D_{is}$, can be calculated by the following expression within an individual shot record, where $x_{is}$ the position of the seismic source 4:

$$D_{is} = \|r_{is} - r_n\| = \sqrt{(x_{is} - x_n)^2 + (y_{is} - y_n)^2 + (z_{is} - z_n)^2}$$

The difference in distance between seismic sensors i and j from the seismic source 4, represented by $d_{ij}$, can be determined by the following expression.

$$d_{ij} = (D_i + D_{is}) - (D_j + D_{js})$$

where $D_{is} = D_{js}$ and represent the seismic source position at the time of the particular shot. For sensors i and j, then if $t_{ij}$, is a time of the arrival of a noise event from the noise source 8, there is then a relationship of the distance, the delay time and acoustic velocity of the water such that:

$$d_{ij} = v t_{ij}$$

The position, $r_n$ of the noise source 8 can be estimated given both a set of values of arrival time $t_{ij}$ of the noise event at each of the sensors 10, and given the position of each sensor $r_i$, where the seismic velocity in the water 14, represented by v, is known or is readily determinable. The values of $t_{ij}$ and $r_i$ are obtained from the seismic data recordings and from the navigation equipment.

To establish $t_{ij}$, in this embodiment of the invention a selected number of individual "traces" (individual seismic data records from a single actuation of one of the seismic sources), typically three or more, are selected for analysis. Arrival times of the noise event attributable to the noise source 8 are determined for the selected traces. The geographic position (x, y, z) of the sensor from which the particular trace was taken is also identified. The geographic position of the seismic source 4 is also noted. A result of identifying arrival times and geographic positions of the corresponding sensors is a set of data representing noise event arrival times and corresponding seismic sensor and seismic source positions. The arrival times and corresponding sensor positions enable determination of the position of the noise source, $r_n$.

Figure 2:
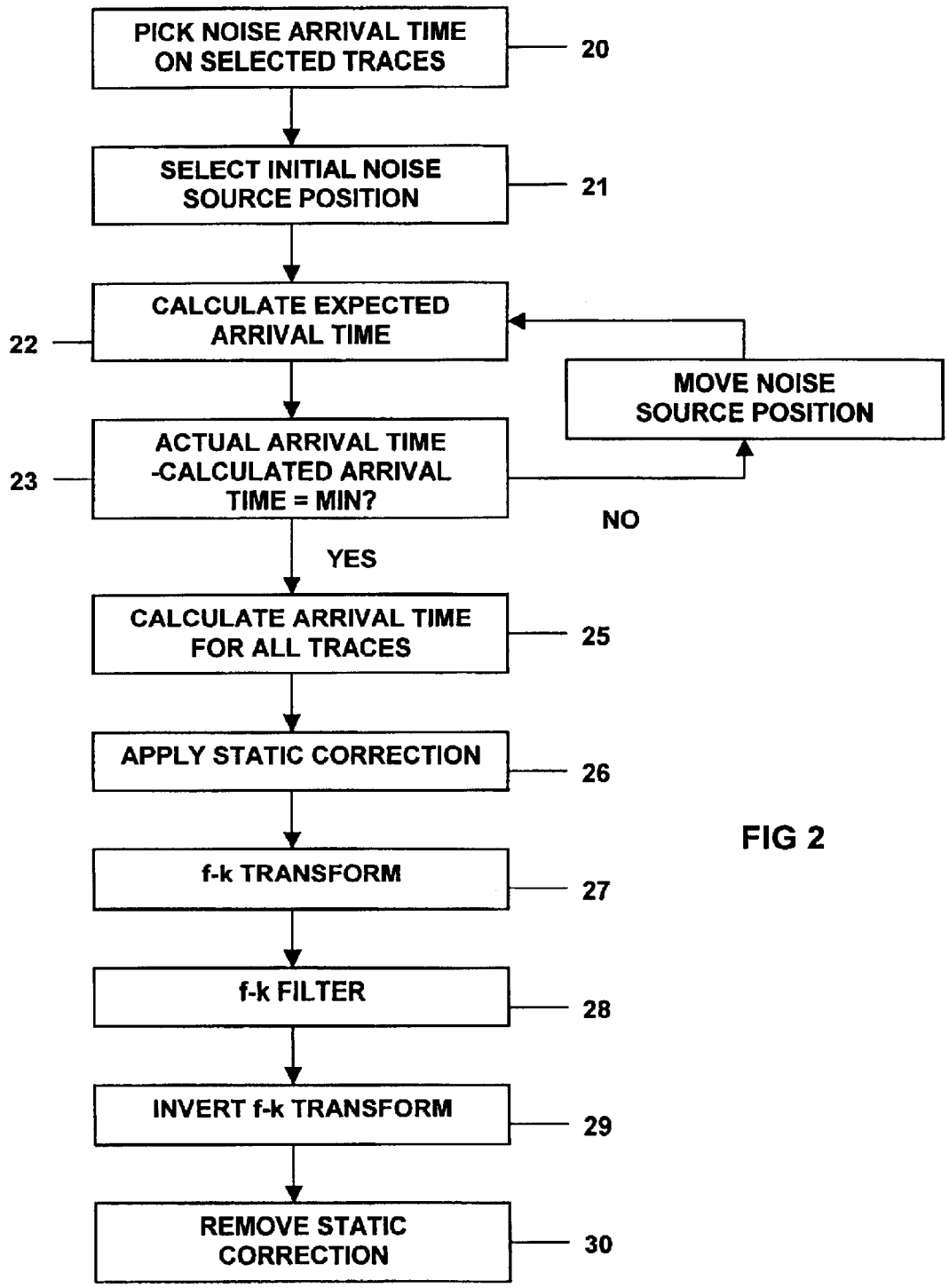
FIG. 2 is a flow chart of one embodiment of a method according to the invention.

Referring to FIG. 2, in this embodiment, a time of arrival of the noise event is selected or "picked" on the selected ones of the traces in a shot record, as shown at 20. The position of the noise source may be determined by first selecting an arbitrary initial position of the noise source, as shown at 21, and then calculating a theoretical or expected noise event arrival time for each selected trace using both the sensor positions and the seismic source position recorded during signal acquisition, as shown at 22. The theoretical or expected arrival time is compared to the selected arrival time of the noise event at each sensor, as shown at 23. At 25, the expected arrival time of the noise event in each selected trace is compared to the actual or picked arrival time. The noise source position is changed, at 24 and the expected arrival time calculation process is repeated if a difference between the expected and actual (picked) arrival time is not at a minimum for all the selected traces. The position of the noise source is ultimately determined when the sum of the differences between theoretical and actual noise event arrival times for all the sensors is minimized, at 23.

Having established the position of the noise source $r_n$ then the noise attributable to the noise source can be attenuated on any or all of the remaining traces by any one of a number of suitable seismic data processing methods known in the art. In the present embodiment, attenuating the noise is performed first by calculating an expected arrival time of the noise event at each sensor position, as shown at 25. Calculating an expected noise event arrival time can be performed by calculating an expected total seismic travel time from the seismic source to the noise source location and from the noise source location and the known recording position of the particular sensor at the time the particular shot was recorded. The expected travel time is calculated from the distance traveled by the seismic energy along the path from seismic source to noise source to the particular sensor, and the velocity of seismic energy in the water, which is known or can be readily determined, as previously explained.

After determining the expected arrival time for the noise event in the traces in a particular shot record, the noise event can be more easily attenuated from the traces. One example of attenuating the noise event in the traces includes equalizing the arrival time of the noise event in each trace in a shot record by statically correcting the arrival time of the noise event in each of the traces, as shown at 26, to a selected constant time, $t_f$. The static correction value applied to each trace can be determined by the following expression:

$$\Delta T = t_f - (d_1 + d_2)/v$$

in which $d_1$ represents the distance from the seismic source (4 in FIG. 1) to the noise source (8 in FIG. 1), and $d_2$ represents the distance from the noise source (8 in FIG. 1) to the particular sensor (10 in FIG. 1) for which the static trace correction is being calculated. The distances $d_1$ and $d_2$ can be calculated in a manner such as previously explained. As in previous expressions, v represents the seismic energy velocity in the water.

After the noise event is statically corrected, in this embodiment a narrow band f-k (frequency-wavenumber) filter is applied to the statically corrected traces. Filtering is done, as shown at 27 in FIG. 2, by first transforming the statically corrected shot record to the f-k domain. A narrow band f-k filter, as shown at 28, may then be applied to the transformed record. The narrow band f-k filter in some embodiments removes non-zero amplitude components in the f-k space near the coordinate axis at k=0 for all values of frequency. After the f-k filtering, as shown at 29, the filtered, transformed shot record is inversely f-k transformed to return to the time-position domain. At 30, the inversely transformed shot record then has the previously applied static correction removed. Removing the static correction returns the traces to their originally recorded times. The resulting shot record represents the original recorded seismic record having the noise resulting from the noise source (8 in FIG. 1) substantially attenuated.

This process may be repeated for any similar noise sources disposed in the water (14 in FIG. 1), which cause back scattered noise in the shot record.

In some embodiments, a maximum distance for selecting possible positions of the noise source (8 in FIG. 1) can be limited to a distance value corresponding to the time length of each trace, T, in the shot record. This distance, $M_d$, may be calculated by the expression:

$$M_d = T/2v$$

The foregoing embodiment of attenuating by applying static correction and f-k filtering is only one example of a method for attenuating the noise event in the seismic data after locating the position of the noise source. Because locating the noise source enables estimating the expected noise arrival time in each trace any one of a number of techniques known in the art for attenuating an event in seismic traces having an expected event time may be used in other embodiments of a method according to the invention.

In another embodiment of the invention, the noise source (8 in FIG. 1) may be a rig or a ship. In this embodiment, noise in the shot record is generated by the noise source (8 in FIG. 1) itself, rather than originating from the seismic source (4 in FIG. 1) and being subsequently reflected or "back scattered" from the noise source (8 in FIG. 1). The noise from this type of noise source is typically referred to as continuous ship noise as previously explained in the Background section herein.

As in the previous embodiment, to attenuate continuous ship noise, first a position of the noise source is estimated from the arrival time of the noise in each one of a selected number of traces in a shot record. In this particular embodiment, however, the arrival time of the noise is related only to the distance between the noise source and each one of the sensors. The position of the seismic source is not related to the travel time of the noise event, because the noise in the shot record originates from the noise source itself. In this embodiment, an arrival time of the noise event is determined on selected traces. A noise source position may then be estimated by selecting an initial position of the noise source, calculating a predicted arrival time based on the initially selected noise source position, determining for each trace a difference between the determined arrival time and the predicted arrival time, and moving the noise source position and repeating the predicting arrival times, and determining differences between determined arrival times and predicted arrival times until the differences reach a minimum.

In one particular embodiment of a method for attenuating continuous ship noise, several "shots" (a "shot" being data recording for a single actuation of the seismic energy source) made along a "sail line" (vessel travel path of the seismic vessel) are selected for analysis. In each selected shot record, a single noise "burst" (a high amplitude event) in a substantially continuous noise train is identified in selected individual traces in each of the shot records. An arrival time of the noise burst in the selected individual traces is determined in each corresponding shot record, and these arrival times are noted. The individual sensor locations $r_i$ (x, y, z) at the time of each shot are also noted and entered into the process. It is not necessary to select the same cycle of the noise burst signal in each shot record, but it is important to select the same relative phase of the noise in each shot record (a corresponding amplitude peak or amplitude trough) when using more than one shot record. It should also be noted that it is not, necessary in this embodiment to note the position of the seismic source (4 in FIG. 1) for each shot record, because the noise travels directly from the noise source to the sensors.

For each shot record, a difference between arrival time of the noise event in the current shot record being evaluated and in an adjacent (previous or subsequent) shot record is determined. An initial position of the noise source is selected and an expected travel time difference between shot records for each selected trace is determined. The noise source position is moved and this process is repeated until the total time difference for all shots for all the selected sensors is minimized. The noise source position is determined when the sum of the differences reaches a minimum value.

Having established the noise source position, $r_n$, then the noise can be attenuated on any selected traces by any suitable seismic data processing methods. Attenuating the noise may be performed, for example, by calculating an expected noise arrival time at each the sensor position at the time of recording of each shot record. The expected noise event arrival time may be used to enable attenuation of the noise event, such as by using static correction and narrow-band f-k filtering as in previous embodiments directed to attenuating back scattered noise.

In the present embodiment using multiple shot records, the location, $r_n$, of the noise source may not be the same in each shot record, because the noise source may be a ship in motion, for example. If the position of the noise source is not the same in each shot record for which the position is determined, it may be preferable to average the noise source position over a limited number of shots to be able to use a single value of $r_n$ for all the shot records. Alternatively, it may be advantageous to interpolate the noise source's location with respect to time, so that a more precise estimate is made of the position of the noise source at any particular time. By making an estimate of the noise source position for each shot record, correct estimates of the noise source position can be made at the time that the shot is recorded.

The embodiments of a method according to the invention explained above require determining an arrival time of the noise event in selected traces. Obtaining the noise event arrival time $t_{ij}$, can be done in one of several ways. The user may visually identify or "pick" the noise events in individual traces. As previously explained, this is usually performed on selected traces, but visual selection can be preformed on all traces in one or more shot records. Alternatively, arrival times of the noise event may be performed automatically. One embodiment of automatic selection of noise event arrival times includes cross-correlating individual traces in a shot record to each other, and then automatically selecting a peak value of the cross correlation.

Figure 3:
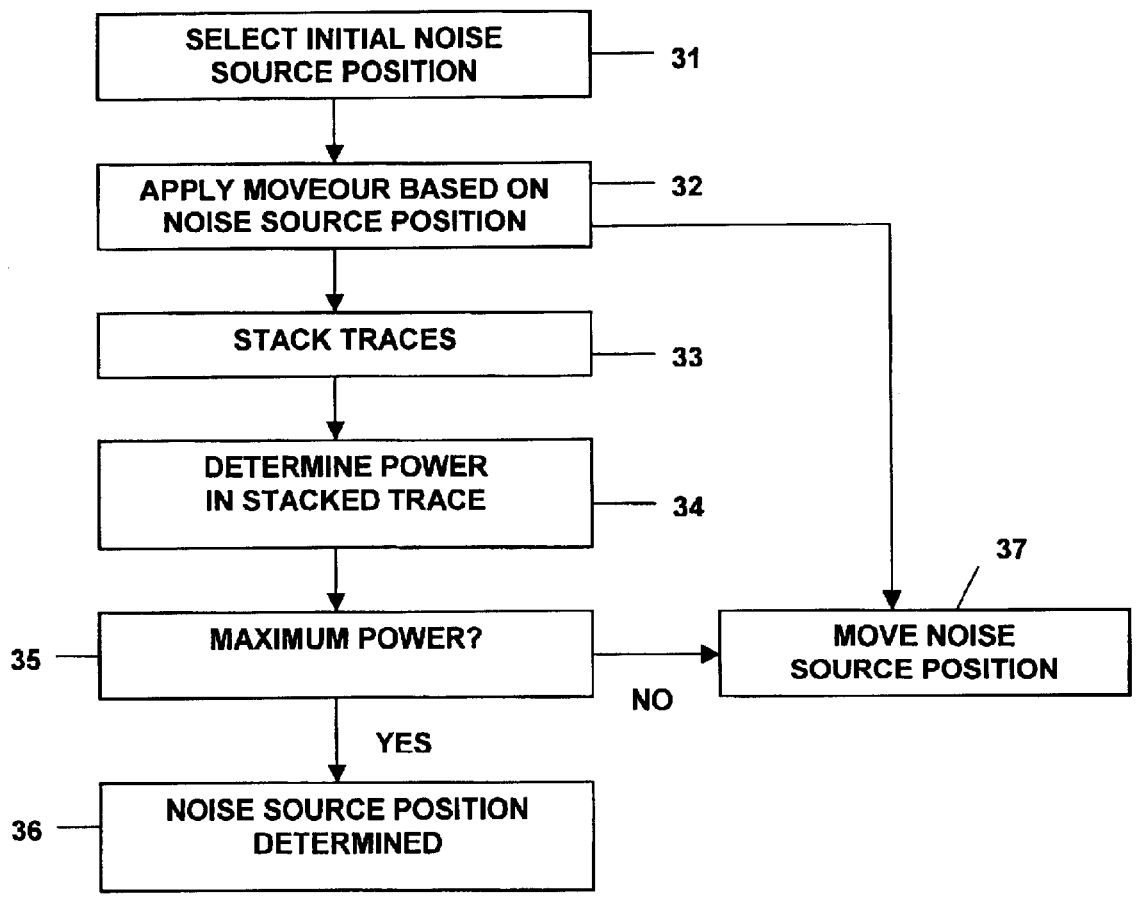
FIG. 3 is a flow chart of an alternative embodiment for determining a position of a noise source.

In another embodiment of a method according to the invention, shown in a flow chart in FIG. 3, the noise source position can be determined directly by using moveout and stacking. In this embodiment, a constant water velocity is assumed. The water velocity may be measured or otherwise readily determined. First, an initial position of the noise source is selected, as shown at 31 in FIG. 1. At 32, a moveout correction is applied to the shot record based on the initially selected noise source position. An amount of moveout, in units of time, can be determined from the water velocity, and a total travel distance from the seismic source (4 in FIG. 1) via the noise source (8 in FIG. 1) to the particular one of the sensors (10 in FIG. 1) for which the trace is being moveout corrected. Two individual distances which make up the total travel distance, namely the distance between the seismic source and the noise source, and the distance from the noise source to each sensor, may be calculated as explained earlier with reference to $d_1$ and $d_2$.

After moveout based on the estimated noise source position is applied to the traces, the moveout adjusted traces in the shot record are then stacked, as shown at 33. A power of the stacked trace is then calculated, as shown at 34. For each possible noise source position, a new moveout correction is applied to the traces, the moveout corrected traces are stacked and a power of each stacked trace is calculated. For each noise source location, the power in the associated stacked trace is checked to determine if it is a maximum value, at 35. If the power is not at a maximum, the noise source position is moved, at 37. The position of the noise source is determined, at 36, as the location that provides the most power in the stacked trace. This method is similar to semblance calculations known in the art for velocity estimation in seismic data analysis.

In this embodiment, just as in the previous embodiments, once the travel time from the noise source for the appropriate noise event to each sensor is calculated, any one of many techniques known in the art may be used to process the data to enable separating the noise from useful seismic signals. For example, static shifting may be used to time-align the noise within the shot record and then narrow band f-k (frequency-wavenumber) filtering can be applied to remove the aligned signal. After noise filtering, the data may then be unshifted in time to provide shot records with substantially attenuated noise event contained therein.

Figure 4:
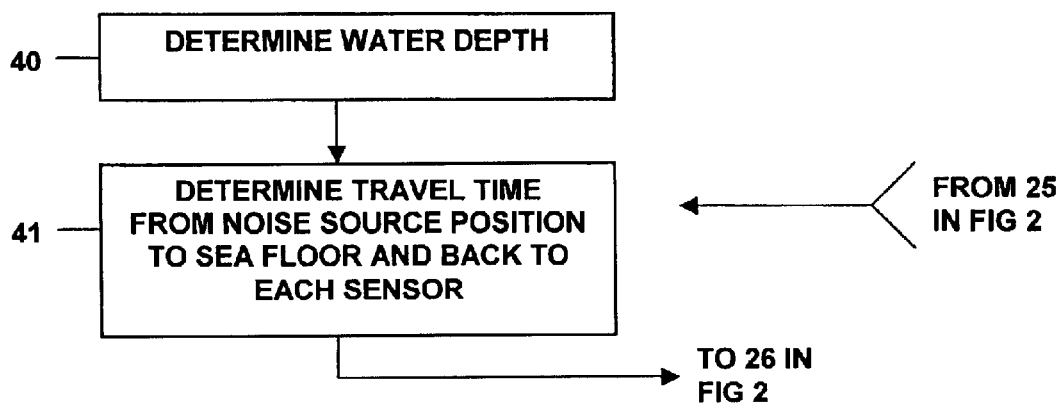
FIG. 4 is a flow chart of an embodiment of the invention which includes attenuating the effects of multiple noise reflections from the sea floor.

In the embodiments of a method according to the invention described above, the identified noise is assumed to travel through the water substantially directly from the noise source to the seismic sensors. In other embodiments, "multiples" of the noise event (noise that has reflected off the sea floor) may be attenuated. Referring to FIG. 4, after the arrival time of the direct noise event is determined for all the traces (25 in FIG. 2), the water depth in the location of the seismic acquisition system is determined, as shown at 40. Using the water depth, the seismic velocity in the water and the positions of the individual sensors (10 in FIG. 1) and the noise source (8 in FIG. 1), travel times from the noise source to the sensors via the sea-floor are estimated, as shown at 41. Events which fit this travel time limitation in each of the recorded traces may be removed by methods known in the art, for example, as described above with reference to FIG. 2, starting at application of the static correction (at 26 in FIG. 2).

The foregoing embodiments of a method according to the invention use a form of indirect inversion to determine the position of the noise source. In other embodiments, the position of the noise source can be determined by direct inversion of the noise event arrival times and the position of each of the sensors. One example of direct inversion is explained below.

For N seismic sensors, an estimated distance $\hat{D}_i$ from the i-th one of the sensors to the noise source, is determined by simplification to a linear solution using an expression such as:

$$\hat{D}_i = R_n + \hat{d}_{i0}$$

where $R_n$ is the is the distance from the previously described origin to the noise source position, and $\hat{d}_{i0}$ is an estimated distance difference between the i-th seismic sensor and the origin based on the difference in noise event arrival time determined between the origin and the i-th sensor, as represented by the following expression.

$$\hat{d}_{i0} = t_{ij} v$$

Assuming a model of the acquisition system and the energy detected by the sensors which excludes any noise, the square of the distance from the i-th seismic sensor to the noise source is given by the expression.

$$D_i^2 = \|r_i - r_n\|^2$$

where $r_i$ is a vector connecting the noise source location to the i-th seismic sensor and is defined as:

$$r_i = [x_i, y_i, z_i]$$

Using the vector identity, the equation above defining distance between the noise source and each of the sensors may be expanded to the following:

$$D_i^2 = R_i^2 - 2 r_i^T r_n + R_n^2.$$

A spherical least-squares error function can then be defined as the difference between the noise-free model (the immediately preceding equation) and the estimated distance $\hat{D}_i$ as shown below.

$$E_i(r_n) = \frac{1}{2}\left(\hat{D}_i^2 - D_i^2\right)$$
$$= r_i^T r_n + \hat{d}_{i0} R_u - \frac{1}{2}\left(R_i^2 - \hat{d}_{i0}^2\right)$$

For N seismic sensors, this can be written in matrix form as:

$$E(r_n) = A\theta - b, \text{ where } A = \lfloor S | \hat{d} \rfloor$$

$$S = \begin{bmatrix} x_1 & y_1 & z_1 \\ x_2 & y_2 & z_2 \\ \vdots & \vdots & \vdots \\ x_n & y_n & z_n \end{bmatrix}$$

which represents a table of seismic sensor positions; $\hat{d} = [\hat{d}_{10}^2 \ldots \hat{d}_{N0}^2]$ which represents a table of noise event arrival times;

$$\theta = \begin{bmatrix} x_n \\ y_n \\ z_n \\ R_n \end{bmatrix}$$

in which $\theta$ represents the noise source position; and finally $$b = \frac{1}{2} \begin{bmatrix} R_1^2 - \hat{d}_{10}^2 \\ R_2^2 - \hat{d}_{20}^2 \\ \vdots \\ R_N^2 - \hat{d}_{N0}^2 \end{bmatrix}$$

which represents a table of known distances between the noise source to each of the seismic sensors. A least-squares solution to the above equation for the error function $E_t(r_n)$ is given by the expression:

$$\hat{\theta}_1 = A^t b$$
$$= (A^T A)^{-1} A^T b$$

The least squares solution to the above equations is the position of the noise source for which the value of the error function is minimized. Thus, the least squared solution represents the position of the noise source.

Figure 5:
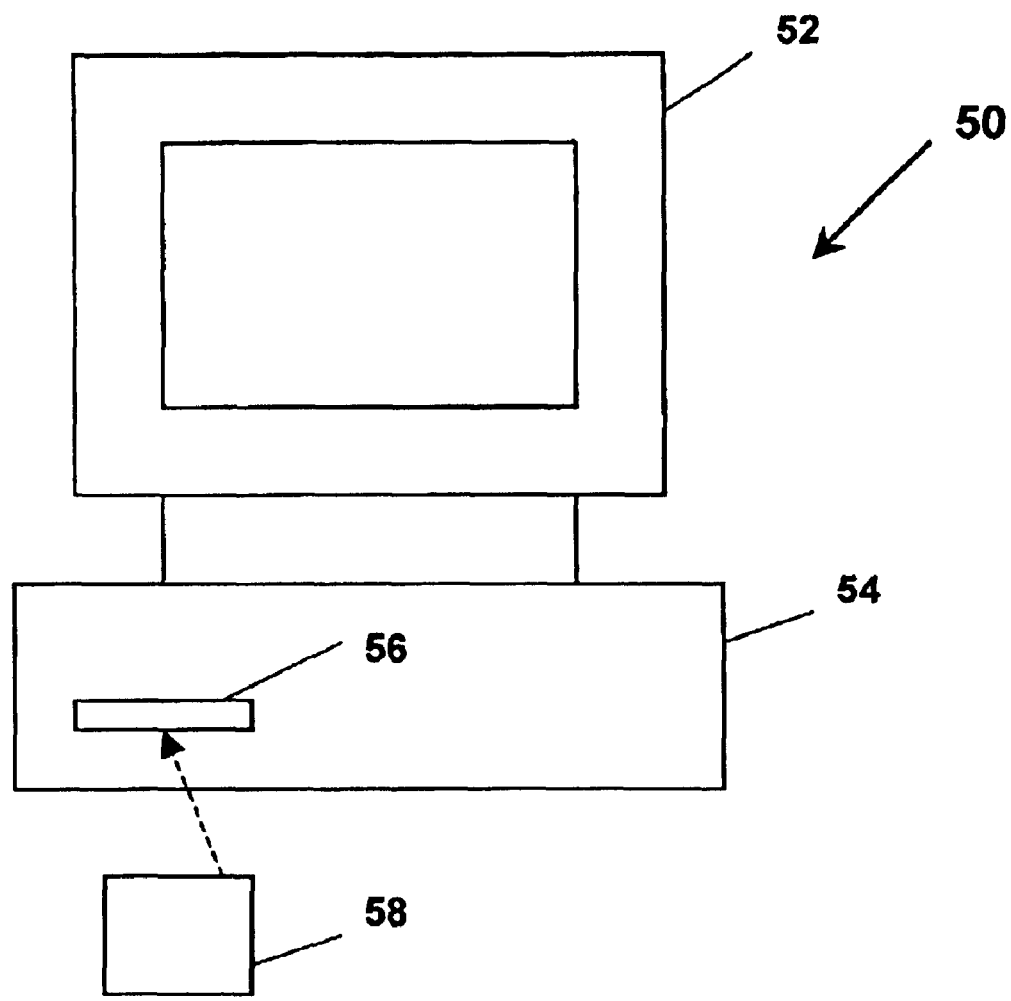
FIG. 5 shows a programmable computer and computer readable medium containing programming instructions to cause the computer to perform a method according to the invention.

Embodiments of a method according to the invention are typically performed by a general purpose computer. In one aspect, the invention may comprise a set of encoded instructions to cause a programmable computer to perform the various elements of a method according to the invention. In FIG. 5, a general purpose programmable computer 50 includes a central processing unit 54, a display device such as a video monitor 52, and a storage reading device, 56 such as a CD-ROM drive or magnetic disk drive. Computer programming instructions adapted to cause the computer 50 to execute a method according to the invention may be stored on a computer readable medium 58, which may be a CD-ROM or magnetic diskette.

Embodiments of a method according to the invention can efficiently attenuate the effects of noise sources such as continuous ship noise and back scattered noise in marine seismic data.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for attenuating noise in marine seismic signals caused by a noise source in the water, comprising:
   determining an arrival time of a noise event at each of a first plurality of seismic sensors;
   estimating a position of the noise source from the arrival times;
   estimating an arrival time of the noise event at each of a second plurality of other seismic sensors; and
   attenuating the noise event from the signals detected by the first and second plurality of seismic sensors using the estimated arrival times.

2. The method as defined in claim 1 further comprising limiting a time interval within which the arrival time is determined based on a shot recording time of the seismic signals.

3. The method as defined in claim 1 further comprising determining an arrival time of multiple reflections of the noise event from the sea floor and attenuating the multiple reflections from the seismic signals.

4. The method as defined in claim 1 wherein the first plurality of seismic sensors comprises a subset of the second plurality of sensors, and the second plurality of seismic sensors comprises substantially all seismic sensors in a marine seismic acquisition system.

5. The method as defined in claim 1 wherein the estimating the position of the noise source comprises:
   selecting apparent arrival times of the noise event in traces corresponding to the first plurality of sensors;
   selecting an initial position of the noise source;
   calculating an expected arrival time of the noise event in the selected traces;
   comparing the expected arrival times with the apparent arrival times;
   moving the position of the noise source; and
   repeating the calculating the expected arrival times and comparing until a difference between the expected arrival times and the selected arrival times reaches a minimum.

6. The method as defined in claim 1 wherein the estimating the position of the noise source comprises inverting noise event arrival times and positions of each of the plurality of seismic sensors.

7. The method as defined in claim 1 wherein the estimating the position of the noise source comprises:
   selecting apparent arrival times of the noise event in corresponding selected traces in a plurality of shot records, the traces corresponding to the first plurality of seismic sensors;
   selecting an initial position of the noise source;
   calculating an expected arrival time of the noise event in the corresponding selected traces;
   comparing the expected arrival times with the apparent arrival times;
   moving the position of the noise source; and
   repeating the calculating the expected arrival times and comparing until a difference between the expected arrival times and the selected arrival times reaches a minimum.

8. The method as defined in claim 7 wherein the determining arrival times comprises selecting one of a corresponding amplitude peak and a corresponding amplitude trough of the noise event in corresponding traces in each of a plurality of shot records.

9. The method as defined in claim 1 wherein the determining the position of the noise source comprises:
   selecting an initial position for the noise source;
   applying moveout to sensor traces based on the selected position of the noise source;
   stacking the traces; and
   moving the noise source position and repeating the applying moveout and stacking until a power in the stacked traces reaches a maximum.

10. The method as defined in claim 1 wherein the attenuating the noise event comprises applying static correction to the traces and applying a frequency wavenumber filter to the static corrected traces.

11. A method for acquiring marine seismic data, comprising:
   towing a plurality of seismic sensors in the water;
   towing at least one seismic source in the water;
   actuating the seismic source;
   recording seismic signals detected by the sensors and a position of each of the sensors and the source at a time of the recording;
   determining an arrival time of a noise event at selected ones of the plurality of seismic sensors;
   estimating a position of a source of the noise event from the arrival times;
   estimating an arrival time of the noise event at each of the plurality of seismic sensors; and
   attenuating the noise event from the signals detected by the plurality of seismic sensors using the estimated arrival times.

12. The method as defined in claim 11 further comprising limiting a time interval within which the arrival time of the noise event is determined based on a shot recording time of the seismic signals.

13. The method as defined in claim 11 further comprising determining an arrival time of multiple reflections of the noise event from the sea floor and attenuating the multiple reflections from the seismic signals.

14. The method as defined in claim 11 wherein the determining the arrival time is performed on signals detected by a subset of the plurality of sensors, and the attenuating is performed on the signals detected by substantially all of the plurality of sensors.

15. The method as defined in claim 11 wherein the estimating the position of the noise source comprises:
   selecting apparent arrival times of the noise event in selected traces, the traces corresponding to recorded seismic signals;
   selecting an initial position of the noise source;
   calculating an expected arrival time of the noise event in each of the selected traces;
   comparing the expected arrival times with the apparent arrival times;
   moving the position of the noise source; and
   repeating the calculating the expected arrival times and comparing until a difference between the expected arrival times and the selected arrival times, reaches a minimum.

16. The method as defined in claim 11 wherein the estimating the position of the noise source comprises inverting noise event arrival times and positions of each of the plurality of seismic sensors.

17. The method as defined in claim 11 wherein the estimating the position of the noise source comprises:
   selecting apparent arrival times of the noise event in corresponding selected traces in a plurality of shot records;
   selecting an initial position of the noise source;
   calculating an expected arrival time of the noise event in the corresponding selected traces;
   comparing the expected arrival times with the apparent arrival times;
   moving the position of the noise source; and
   repeating the calculating the expected arrival times and comparing until a difference between the expected arrival times and the selected arrival times reaches a minimum.

18. The method as defined in claim 17 wherein the determining arrival times comprises selecting one of a corresponding amplitude peak and a corresponding amplitude trough of the noise event in corresponding traces in each of a plurality of shot records.

19. The method as defined in claim 11 wherein the determining the position of the noise source comprises:
   selecting an initial position for the noise source;
   applying moveout to sensor traces based on the selected position of the noise source;
   stacking the traces; and
   moving the noise source position and repeating the applying moveout and stacking until a power in the stacked traces reaches a maximum.

20. The method as defined in claim 11 wherein the attenuating the noise event comprises applying static correction to the traces and applying a frequency wavenumber filter to the static corrected traces.

21. A computer programmed to execute a program for attenuating noise in marine seismic data, the program comprising the steps of:
   determining an arrival time of a noise event at each of a first plurality of seismic sensors;
   estimating a position of the noise source from the arrival times;
   estimating an arrival time of the noise event at each of a second plurality of other seismic sensors; and
   attenuating the noise event from the signals detected by the first and second plurality of seismic sensors using the estimated arrival times.

22. The computer as defined in claim 21 wherein the program further comprises limiting a time interval within which the arrival time is determined based on a shot recording time of the seismic signals.

23. The computer as defined in claim 21 wherein the program further comprises determining an arrival time of multiple reflections of the noise event from the sea floor and attenuating the multiple reflections from the seismic signals.

24. The computer as defined in claim 21 wherein in the program the first plurality of seismic sensors comprises a subset of the second plurality of sensors, and the second plurality of seismic sensors comprises substantially all seismic sensors in a marine seismic acquisition system.

25. The computer as defined in claim 21 wherein in the program the estimating the position of the noise source comprises:
   selecting apparent arrival times of the noise event in traces corresponding to the first plurality of sensors;
   selecting an initial position of the noise source;
   calculating an expected arrival time of the noise event in the selected traces;
   comparing the expected arrival times with the apparent arrival times;
   moving the position of the noise source; and
   repeating the calculating the expected arrival times and comparing until a difference between the expected arrival times and the selected arrival times reaches a minimum.

26. The computer as defined in claim 21 wherein the estimating the position of the noise source comprises inverting noise event arrival times and positions of each of the plurality of seismic sensors.

27. The computer as defined in claim 21 wherein in the program the estimating the position of the noise source comprises:
   selecting apparent arrival times of the noise event in corresponding selected traces in a plurality of shot records, the traces corresponding to the first plurality of seismic sensors;
   selecting an initial position of the noise source;
   calculating an expected arrival time of the noise event in the corresponding selected traces;
   comparing the expected arrival times with the apparent arrival times;
   moving the position of the noise source; and
   repeating the calculating the expected arrival times and comparing until a difference between the expected arrival times and the selected arrival times reaches a minimum.

28. The computer as defined in claim 27 wherein in the program the determining arrival times comprises selecting one of a corresponding amplitude peak and a corresponding amplitude trough of the noise event in corresponding traces in each of a plurality of shot records.

29. The computer as defined in claim 21 wherein in the program the determining the position of the noise source comprises:

selecting an initial position for the noise source;

applying moveout to sensor traces based on the selected position of the noise source;

stacking the traces; and moving the noise source position and repeating the applying moveout and stacking until a power in the stacked traces reaches a maximum.

30. The computer as defined in claim 21 wherein in the program the attenuating the noise event comprises applying static correction to the traces and applying a frequency wavenumber filter to the static corrected traces.

31. A computer program stored in a computer-readable medium, the program having logic to cause a programmable computer to perform steps comprising:

determining an arrival time of a noise event at each of a first plurality of seismic sensors;

estimating a position of the noise source from the arrival times;

estimating an arrival time of the noise event at each of a second plurality of other seismic sensors; and attenuating the noise event from the signals detected by the first and second plurality of seismic sensors using the estimated arrival times.

32. The computer program as defined in claim 31 further comprises limiting a time interval within which the arrival time is determined based on a shot recording time of the seismic signals.

33. The computer program as defined in claim 31 further comprises determining an arrival time of multiple reflections of the noise event from the sea floor and attenuating the multiple reflections from the seismic signals.

34. The computer program as defined in claim 31 wherein the first plurality of seismic sensors comprises a subset of the second plurality of sensors, and the second plurality of seismic sensors comprises substantially all seismic sensors in a marine seismic acquisition system.

35. The computer program as defined in claim 31 wherein the estimating the position of the noise source comprises:

selecting apparent arrival times of the noise event in traces corresponding to the first plurality of sensors;

selecting an initial position of the noise source;

calculating an expected arrival time of the noise event in the selected traces;

comparing the expected arrival times with the apparent arrival times;

moving the position of the noise source; and repeating the calculating the expected arrival times and comparing until a difference between the expected arrival times and the selected arrival times reaches a minimum.

36. The computer program as defined in claim 31 wherein the estimating the position of the noise source comprises:

selecting apparent arrival times of the noise event in corresponding selected traces in a plurality of shot records, the traces corresponding to the first plurality of seismic sensors;

selecting an initial position of the noise source;

calculating an expected arrival time of the noise event in the corresponding selected traces;

comparing the expected arrival times with the apparent arrival times;

moving the position of the noise source; and repeating the calculating the expected arrival times and comparing until a difference between the expected arrival times and the selected arrival times reaches a minimum.

37. The computer program as defined in claim 36 wherein the determining arrival times comprises selecting one of a corresponding amplitude peak and a corresponding amplitude trough of the noise event in corresponding traces in each of a plurality of shot records.

38. The computer program as defined in claim 31 wherein the determining the position of the noise source comprises:

selecting an initial position for the noise source;

applying moveout to sensor traces based on the selected position of the noise source;

stacking the traces; and moving the noise source position and repeating the applying moveout and stacking until a power in the stacked traces reaches a maximum.

39. The computer program as defined in claim 31 wherein the attenuating the noise event comprises applying static correction to the traces and applying a frequency wavenumber filter to the static corrected traces.

40. The computer program as defined in claim 31 wherein the estimating the position of the noise source comprises inverting noise event arrival times and positions of each of the plurality of seismic sensors.

* * * * *